Dec. 25, 1934.   F. A. THAHELD ET AL   1,985,528
AIR AND FUEL CONTROLLING MEANS FOR INTERNAL COMBUSTION ENGINES
Filed Jan. 2, 1932   2 Sheets-Sheet 2
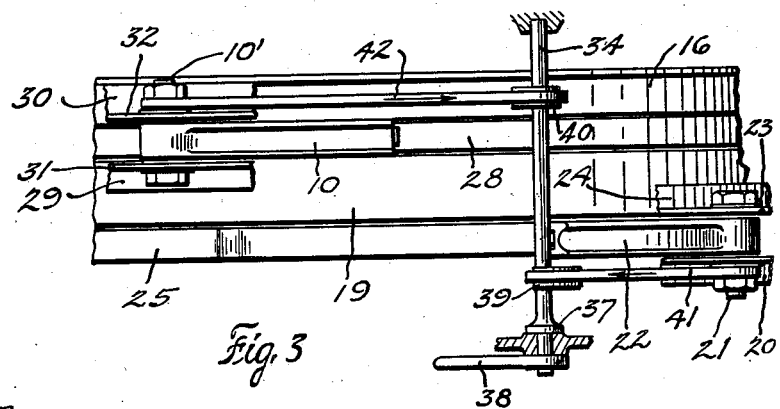
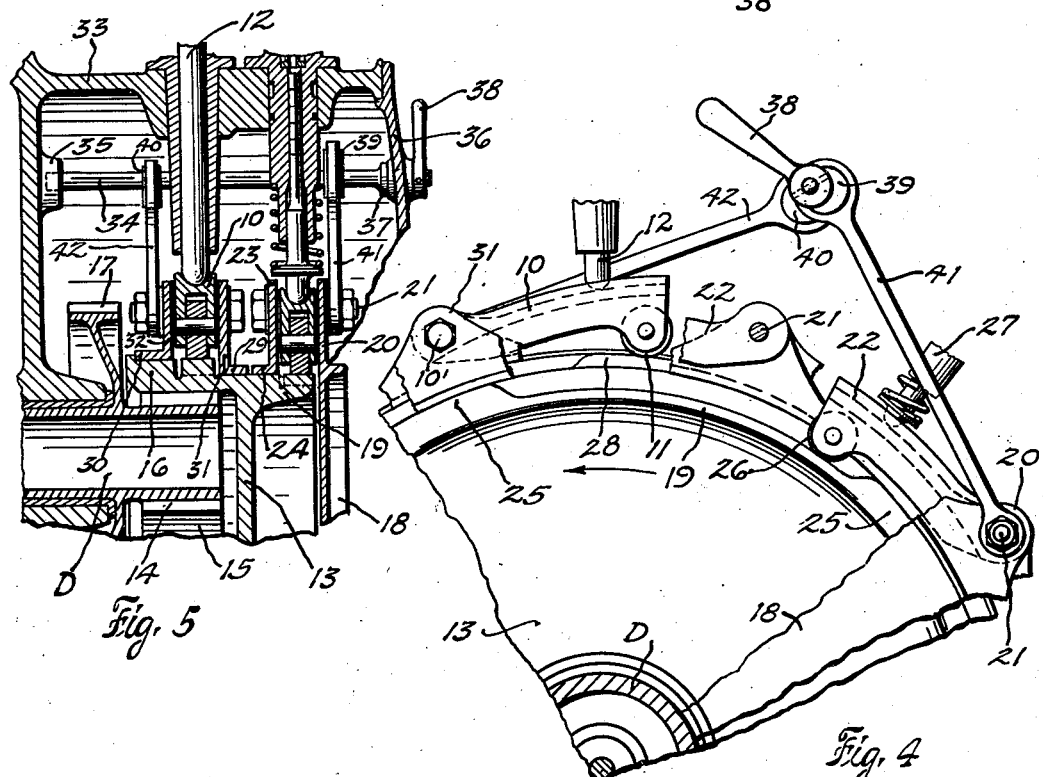
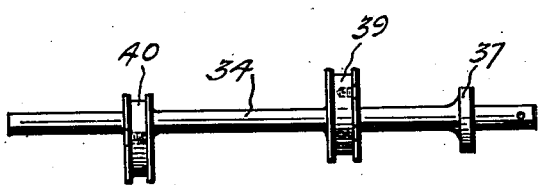
Inventors
Feri A. Thaheld
Charles S. Crickmer
By
Jack A. Ashley
Attorney Patented Dec. 25, 1934

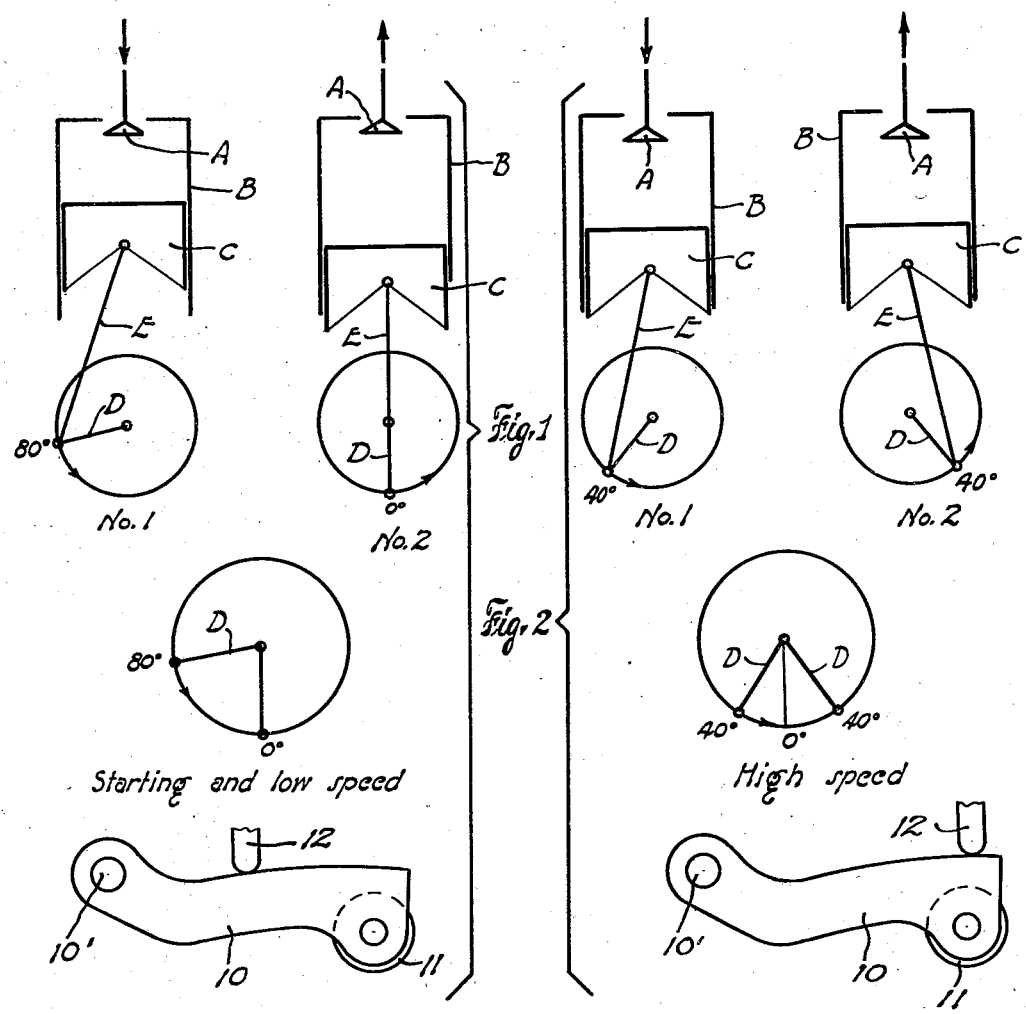

1,985,528

UNITED STATES PATENT OFFICE 1,985,528

AIR AND FUEL CONTROLLING MEANS FOR INTERNAL COMBUSTION ENGINES

Feri A. Thaheld and Charles S. Crickmer, Dallas, Tex., assignors, by mesne assignments, to Guiberson Diesel Engine Company, Dover, Del., a corporation of Delaware Application January 2, 1932, Serial No. 584,440

3 Claims. (Cl. 123—32)

This invention relates to new and useful improvements in air and fuel controlling means for internal combustion engines.

The invention pertains more particularly to engines of the type which fire under heat of compression, and has to do with means for varying the compression in proportion to the speed of the engine and conjointly with the variation of the fuel charge in relation to the timing of the engine.

One object of the invention is to provide means for controlling the admission of air and the escape of the exhaust gases, whereby the admission of air and the escape of the exhaust gases may be increased proportionately as the speed of the engine is increased, and conversely, the admission of air and the escape of the exhaust gases may be decreased in proportion to the decrease in speed. By this arrangement the air is permitted to more readily enter the cylinder and with greater volumetric efficiency at higher speeds, and also the exhaust gases may more readily escape. When the speed is decreased a choking action is effected which retards the entrance of air and the escape of the hot exhaust gases, which results in a considerable dilution of the incoming air with the warm exhaust gases. This warm diluted air will promote combustion or burning of the fuel at low speeds, and thereby much lower idling of the engine may be obtained.

A further object of the invention is to provide controlling means arranged to co-act with the crank shaft, whereby the time of opening the air inlet and exhaust valve or valves and the time during which the same remain open is automatically controlled by the throttle, whereby the highest volumetric efficiency for each particular speed is had.

A construction designed to carry out the invention will be hereinafter described together with other features of the invention.

The invention will be more readily understood from a reading of the following specification and by reference to the accompanying drawings in which an example of the invention is shown, and wherein:

Figure 1 is a diagrammatical view illustrating positions of the various parts at the starting points and at low speed in accordance with the invention, Figure 2 is a similar view indicating the positions of said parts at high speed, Figure 3 is a plan view of a controlling means constructed in accordance with the invention, Figure 4 is a side elevation of the same, Figure 5 is a vertical sectional view of the controlling means, and Figure 6 is an elevation of the controlling shaft.

In Figures 1 and 2 of the drawings, A indicates a valve serving both as an air inlet valve and as an exhaust valve, however, the invention is not to be limited to a single valve. The valve is indicated as located at the top of a cylinder B having a piston C working therein, which is connected to a crank shaft D by a connecting rod E. In explaining the theory of the invention, and as an illustration, the valve A may be opened when the crank D is at a position of 80° before bottom center and after the cylinder has fired, as shown in position Number 1, in Figure 1. The crank shaft travels from the position Number 1, a complete revolution and after again passing position Number 1, moves to the position shown at Number 2, in Figure 2, before the valve is closed. During this travel of the crank shaft and piston the burnt gases are exhausted and a fresh charge of air is drawn into the cylinder. While the crank actually travels 440° between the opening and closing of the valve, the opening point and the closing point are approximately 80° apart in the orbit of the circle traveled by the crank shaft.

It will be noted that while the valve is open during a portion of the firing, exhaust and intake strokes of the piston C, it is pointed out that the valve A is only partially opened so as to restrict the admission of air and retard the escape of the exhaust gases, and further, said valve is closed when the crank D starts its upward movement, or at the beginning of the compression stroke. This arrangement gives a comparatively short power stroke, but provides for a maximum compression stroke. The heat of compression together with the heat resulting from the trapped exhaust gases creates such a temperature within the cylinder that when the fuel is injected ignition will readily take place. By this means an extremely low idling speed and smooth running of the engine is easily obtained.

At the lower portion of Figure 1, a tripping lever 10 is illustrated, and has its pivot point at 10', while at its opposite end a tripping roller 11 is provided. A valve plunger 12 rides upon the upper side of the lever. This plunger is suitably connected with the valve A so as to open it when the lever is swung and the plunger displaced. It is obvious that the greater the distance of the point from the pivot 10' at which the plunger rests upon the lever, the greater the lift or travel of said plunger and the more the valve is opened. In Figure 1, the plunger rests near the central portion of the lever, and when said lever is tripped, the valve A will be opened for low speeds to the point indicated in Figure 1.

In Figure 2 positions of the parts are shown at high speed. The throttle of the engine has been advanced and the lever 10 has been moved so that the plnger 12 is near its swinging end and will thus be lifted to a greater extent, whereby the valve A will be fully opened to admit a full charge of air and permit a free escape of the exhaust gases. However, the tripping means for the levers is so related with the crank shaft D that as the lift of the plunger is increased, the length of the suction stroke of the piston is increased, and consequently instead of opening the valve A at 80° before bottom center, as is shown in Figure 1, the valve will open when the crank is 40° before bottom center when the engine is running at high speed. The valve still remains open during 440° of travel of the crank, and therefore will not close until 40° after bottom center, or during the beginning of the compression stroke, which is indicated position Number 1 and position Number 2, in Figure 2. The late closing of the valve on the intake stroke is very important at high speed in order to take advantage of the velocity energy of the incoming air.

By means of this control the volumetric efficiency of the engine is at the maximum point during all speeds. When this is combined with means for varying the timing of the fuel injection and a proportionate variation in the quantity of fuel injected, an ideal engine operating condition is obtained. This will be more apparent when it is considered that as the amount and time of the injection of fuel is changed so is the time of the air entering the cylinder changed, thus the two functions are coordinated and are controlled with relation to the speed of the engine.

In Figures 3 to 6 means for carrying out the controlling operations are illustrated. A cam disk 13 is provided. This disk may be rotated by a pinion 14 engaging a gear ring 15 on the inner periphery of the flange 16 of said disk. The pinion 14 is shown as attached to a gear 17 which is suitably driven from the crank shank of the engine. This particular driving means is fully set forth in my co-pending application filed April 7th, 1930, Serial No. 442,316. However, it is to be understood that the cam disk may be driven in any suitable manner so long as it is rotated by the crank shaft.

A circular adjusting plate 18 is mounted adjacent the annular flange 19 of the disk 13. The plate is provided with a plurality of ears 20 receiving pivot bolts 21. A lever 22 is pivoted on each bolt 21 and each bolt 21 is also supported in the ear 23 of a ring 24 rotatably mounted on the flange 19. The flange 19 is provided with cams 25 rotating in the path of a roller 26 carried by the lever 22. The disk 13 is revolved in a counter clockwise direction and as the cams 25 pass under the roller 26 the lever 22 is lifted and thus swung on its bolt 21.

The plunger 27 of a fuel pump (not shown) engages the upper side of the lever 22, and when this lever is lifted the plunger is operated to inject fuel into the cylinder B. By shifting the plate 18 circumferentially the lever 22 is adjusted with relation to the plunger 27, and the further the plunger is from the bolt 21, the longer is its stroke. Consequently by adjusting the plate 18 the quantity of fuel is varied. When the plate 18 is adjusted, it is rotated relatively of the disk 13, and thus the time at which the cams 25 engage the rollers 26 is changed. By this arrangement the timing of the fuel injection and the quantity of the fuel injected are both controlled by the position of the plate 18, although the relation between the disk 13 and the crank shaft D is not changed.

The flange 16 of the disk 13 is provided with cams 28. On one side of these cams a supporting ring 29 is rotatably mounted, and on the opposite side of said cams a decompression ring 30 is rotatably mounted on said flange. The ring 29 is provided with an ear 31 while the ring 30 is provided with ears 32, and these ears support the pivot bolt 10' on which the levers 10 are pivoted. The plunger 12 rests upon the lever 10 and the roller 11 engages the cams 28. It will be noted that the levers 10 are directed oppositely to the levers 22.

In the engine case 33 a control shaft 34 is journaled. The inner end of the shaft is journaled in a boss 35 and the outer end is journaled in a box 36. A collar 37 engaging the box prevents longitudinal displacement of the shaft. A control lever 38 is fastened on the outer end of the shaft exteriorly of the case 33. A pair of flanged eccentrics 39 and 40, respectively, are fastened on the shaft 34 in offset relation. The eccentric 39 has connection with a link 41 which is pivoted at its opposite end to the bolt 21, while the eccentric 40 has connection with a link 42 pivoted at its opposite end on one of the bolts 10'. It will be seen that when the lever 38 is swung the links 41 and 42 will either be pulled or pushed. When the links are pushed the levers 10 and 22 will be relatively spread apart and the parts adjusted for high speed, as indicated in Figure 2, but when the lever 38 is swung in the opposite direction the links will be pulled so as to bring the levers 10 and 22 relatively closer together and the parts will be adjusted for low speed, as is indicated in Figure 1.

It is obvious that the control of the admission of air, the escape of the exhaust gases, the injection of fuel and the timing of such injection are all accomplished by a simple adjustment of the hand lever 38. By swinging the lever in a clockwise direction, Figure 4, the parts are immediately adjusted to choke the admission of air, retard the escape of the exhaust gases, reduce the quantity of fuel, and retard its injection. Conversely, by swinging the lever 38 in a counter clockwise direction, Figure 4, the admission of air is increased, the exhaust gases are fully released, the quantity of fuel is increased and the timing of the injection is advanced. It will be seen that intermediate adjustments give a proportionate modulation of the fuel factors and timing of the engine. This simple adjustment also varies the suction and compression strokes of the piston and makes for the most efficient performance at all speeds.

Various changes in the size and shape of the different parts, as well as modifications and alterations, may be made within the scope of the appended claims.

Having illustrated and described a preferred form of the invention, what we claim, is:

1. In a throttle for an internal combustion engine, a shaft, oppositely directed eccentrics mounted on said shaft, means for rocking said shaft, links extending in opposite directions from said eccentrics, a pump actuator connected with one of said links, and a valve actuator connected to the other eccentric.

2. In an internal combustion engine, a pump operator, a valve operator, oppositely rotatable members carrying levers engaging said pump and valve operators, means for tripping said levers, and means for rotating said members in opposite directions to vary the actuation of the operators by the levers.

3. In an internal combustion engine, a pump operator, a valve operator, oppositely rotatable members carrying levers engaging said pump and valve operators, means for tripping said levers, and means for rotating said members in common and in opposite directions to vary the actuation of the operators by the levers.

FERI A. THAHELD.
CHARLES S. CRICKMER.